(12) United States Patent
Kunkel et al.

(10) Patent No.: US 9,333,933 B2
(45) Date of Patent: May 10, 2016

(54) AIRBAG PACKAGE FOR AN OCCUPANT RESTRAINING SYSTEM OF A MOTOR VEHICLE, OCCUPANT RESTRAINING SYSTEM, AND METHOD FOR PRODUCING SUCH AN AIRBAG PACKAGE

(71) Applicant: TRW Automotive Safety Systems GmbH, Aschaffenburg (DE)

(72) Inventors: Michael Kunkel, Haibach (DE); Klaus Freudenberger, Aschaffenburg (DE); Dieter Rumpf, Rödermark (DE); Stefan Sapountzis, Erlenbach a. Main (DE); Stefan Hepp, Glattbach (DE); Stefan Bachmann, Heimbuchenthal (DE); Timm Herold, Aschaffenburg (DE)

(73) Assignee: TRW Automotive Safety Systems GmbH (DE)

(*) Notice: Subject to any disclaimer, the term of this patent is extended or adjusted under 35 U.S.C. 154(b) by 0 days.

(21) Appl. No.: 14/395,543

(22) PCT Filed: May 7, 2013

(86) PCT No.: PCT/EP2013/001343
§ 371 (c)(1),
(2) Date: Oct. 20, 2014

(87) PCT Pub. No.: WO2013/167261
PCT Pub. Date: Nov. 14, 2013

(65) Prior Publication Data
US 2015/0130167 A1     May 14, 2015

(30) Foreign Application Priority Data
May 7, 2012 (DE) .......................... 10 2012 008 809

(51) Int. Cl.
*B60R 21/20* (2011.01)
*B60R 21/237* (2006.01)
*B60R 21/231* (2011.01)

(52) U.S. Cl.
CPC ............... *B60R 21/20* (2013.01); *B60R 21/231* (2013.01); *B60R 21/237* (2013.01); *B60R 2021/2375* (2013.01)

(58) Field of Classification Search
CPC ................. B60R 21/20; B60R 21/231; B60R 2021/2375
USPC ..................................................... 280/728.2
See application file for complete search history.

(56) References Cited

U.S. PATENT DOCUMENTS

| 5,022,676 A | 6/1991 | Rogerson et al. |
| 6,422,588 B2 * | 7/2002 | Hieber et al. .............. 280/728.1 |

(Continued)

FOREIGN PATENT DOCUMENTS

| CN | 1990223 | 7/2007 |
| DE | 1031473 | 6/1958 |
| DE | 10 2006 055 037 | 6/2008 |
| DE | 10 2009 033 561 | 1/2011 |
| EP | 1 031 473 | 8/2000 |
| EP | 1 127 752 | 8/2001 |

(Continued)

*Primary Examiner* — James English
(74) *Attorney, Agent, or Firm* — Tarolli, Sundheim, Covell & Tummino LLP

(57) ABSTRACT

The invention relates to an airbag package (1) for an occupant restraint system of an automotive vehicle comprising a folded airbag (2) and clearances formed between the material of the airbag, wherein the airbag package (1) has a real package volume $V_{real}$ composed of the airbag volume $V_{Sack}$ of the airbag (2) and the clearance volume $V_{frei}$ of the clearances. The invention excels by the fact that the ratio $V_{real}/V_{Sack}$ between the package volume $V_{real}$ and the airbag volume $V_{Sack}$ is at most 3.2. The invention further relates to an occupant restraint system comprising such airbag package and to a method of manufacturing an airbag package.

22 Claims, 4 Drawing Sheets

(56) References Cited

U.S. PATENT DOCUMENTS

2001/0017456 A1      8/2001  Hieber et al.
2006/0138749 A1      6/2006  Nakamura et al.
2012/0096735 A1*     4/2012  Nebel et al. .................... 34/357
2012/0267880 A1*    10/2012  Frisk et al. ................. 280/730.2

FOREIGN PATENT DOCUMENTS

| EP | 1 127 752 | 10/2004 |
| EP | 2 594 441 | 5/2013 |
| EP | 2594441 A1 * | 5/2013 |
| WO | 2011/075050 | 6/2011 |

* cited by examiner

| Nummer | Material | $V_{real}$ ∅ | $V_{sack}$ ∅ | $V_{compression}$ ∅ |
|---|---|---|---|---|
| 1.x | Dtex 350 (215x215) UTT | 309,5 cm³ | 189 cm³ | 1,64 |
| 2.x | Dtex 470 (200x190) GST | 379,3 cm³ | 222 cm³ | 1,70 |
| 3.x | Dtex 235 (285x285) GST | 283,9 cm³ | 176 cm³ | 1,62 |
| 4.x | Dtex 350 PET | 310,2 cm³ | 194 cm³ | 1,60 |
| 5.x | Dtex 585 (170x170) GST | 410,2 cm³ | 237 cm³ | 1,73 |

FIG. 5

AIRBAG PACKAGE FOR AN OCCUPANT RESTRAINING SYSTEM OF A MOTOR VEHICLE, OCCUPANT RESTRAINING SYSTEM, AND METHOD FOR PRODUCING SUCH AN AIRBAG PACKAGE

RELATED APPLICATIONS

This application corresponds to PCT/EP2013/001343, filed May 7, 2013, which claims the benefit of German Application No. 10 2012 008 809.4, filed May 7, 2012, the subject matter of which are incorporated herein by reference in their entirety.

BACKGROUND OF THE INVENTION

The invention relates to an occupant restraint system of a vehicle in accordance with the preamble of claim 1. Furthermore, the invention relates to an occupant restraint system comprising such airbag package as well as a method of manufacturing an airbag package. An airbag package of the type mentioned in the beginning is known, for example, from EP 1 127 752 A2.

In general, airbag packages are formed of a folded airbag which is usually made of textile fabric. Between the folds of the airbag and the individual fabric threads, viz. the material of the airbag, clearances are formed in the airbag package. Concretely speaking, the airbag package thus consists of the folded airbag and a particular air volume enclosed in between the material of the airbag.

For the manufacture of an airbag it is known to initially fold the airbag and then to transfer it into a cover cap. In the cover cap the airbag is fixed so that it can subsequently be inserted into a steering wheel or an instrument panel, for example. The outer shape of the airbag package is not stable, however, but independently falls apart unless it is fixed in the cover cap. The airbag package shows this tendency to unfolding again even after being inserted in the cover cap. Consequently, the airbag package constantly urges against the cover cap during its entire service life. This continuous load is shown in the course of time at the tearing edge of the cover cap and impairs the optical appearance of the cover cap.

Also during manufacture the instability of the airbag package entails problems. In the manufacturing method according to EP 1 127 752 A2 the airbag is folded with the aid of a film enclosing the airbag. Subsequently the airbag package has to be removed from the film and transferred into the cover cap. Although the airbag package is compressed under the influence of temperature so that the folding is retained for a limited period of time, the airbag package nevertheless springs somewhat open so that the actual package volume is considerably larger due to the air enclosed therein than the airbag volume which can be calculated as theoretical airbag volume from the density of the material used for manufacturing the airbag. Also, the shaping is not permanent in the manufacturing method according to EP 1 127 752 A2.

SUMMARY OF THE INVENTION

It is the object of the invention to describe an airbag package for an occupant restraint system of a vehicle which facilitates manufacture and permanently improves the optical appearance of a cover cap. Furthermore, it is the object of the invention to describe an occupant restraint system of a vehicle comprising such airbag package as well as a method of manufacturing an airbag package in which the airbag package permanently retains its shape.

In accordance with the invention, this object is achieved with respect to the airbag package by the subject matter of claim 1, with respect to the occupant restraint system by the subject matter of claim 5 and with respect to the method by the subject matter of claim 6.

The invention is based on the idea to describe an airbag package for an occupant restraint system of a vehicle, wherein the airbag package comprises a folded airbag and clearances formed in between the material of the airbag. In particular, the airbag package can consist of the folded airbag and the clearances formed in between the material of the airbag. The airbag package includes a real package volume $V_{real}$ being composed of the airbag volume $V_{Sack}$ of the airbag and the clearance volume $V_{frei}$ of the clearances. In accordance with the invention, the ratio $V_{real}/V_{Sack}$ between the package volume $V_{real}$ and the airbag volume $V_{Sack}$ is at most 3.2.

The ratio $V_{real}/V_{Sack}$ between the package volume $V_{real}$ and the airbag volume $V_{Sack}$ can also be at most 3.0, especially at most 2.5, preferably at most 2.0.

The airbag package according to the invention has a relatively small volume compared to known airbag packages. In this way, altogether smaller constructed spaces can be realized.

Especially small constructed spaces can be used when the ratio $V_{real}/V_{Sack}$ between the package volume $V_{real}$ and the airbag volume $V_{Sack}$ is at most 1.8. This constitutes an especially preferred embodiment of the airbag package according to the invention.

In concrete embodiments, the ratio $V_{real}/V_{Sack}$ between the package volume $V_{real}$ and the airbag volume $V_{Sack}$ can also be at most 1.73, especially at most 1.7, especially at most 1.64, preferably at most 1.62, especially preferred at most 1.6.

Moreover, it can advantageously be provided that the airbag package independently is continuously dimensionally stable. This is achieved as follows:

The dimensional stability retains the airbag package in its shape, i.e. it maintains the relatively small volume. In this way additional auxiliary means are prevented from having to be employed for maintaining the airbag package in the desired shape during transfer into a casing or within a casing. Hence additional component parts increasing the weight and the costs of an airbag module comprising the airbag package can be dispensed with. The continuous dimensional stability further permits realizing reproducible airbag package shapes as well as an individual shaping.

Such individual shaping can be given, for example, by the fact that the airbag package has at least one external surface in which a recess is formed. The at least one external surface thus includes a recess. The recess allows, for example, providing a clearance for an emblem so that an emblem anchored in a cover cap exerts no pressure onto the airbag package.

According to an independent aspect, the invention is based on the idea to state an occupant restraint system of a vehicle comprising an afore-described airbag package. The advantageous further developments and advantages listed in connection with the airbag package are equally applicable to the occupant restraint system.

Another independent aspect of the invention relates to a method of manufacturing an airbag package or an occupant restraint system, especially an airbag package or an occupant restraint system according to any one of the preceding claims, in which a folded airbag is inserted in a molding element and is subsequently compressed and simultaneously heated, the compressing and heating of the airbag being carried out at least until the airbag package is continuously dimensionally stable.

By simultaneous compressing and heating an airbag package is manufactured which can be transferred into a casing, e.g. into a cover cap, substantially without any change of volume. Thus the manufacture of the airbag package is considerably facilitated and at the same time the production of airbag packages having as small package volumes as possible is enabled.

In accordance with a preferred configuration of the method according to the invention, the molding element has an inner contour corresponding to the inner contour of a receiving space for the airbag package in the occupant restraint system. In the method the airbag package is compressed and heated in an advantageous manner already in the shape which it is intended to take also later in the occupant restraint system. Since the airbag package is continuously dimensionally stable, the airbag package is prevented from exerting a force on the enclosure of the receiving space, especially a cover cap, which might impair the optical appearance.

The airbag is compressed and heated preferably over a period of time of at least one hour, preferably about two hours. It has turned out that this period of time is sufficient for manufacturing a continuously dimensionally stable airbag package.

Preferably the airbag is heated to a temperature of at least 125° C., further preferably at least 140° C., especially preferred about 150° C. In combination with the simultaneous compressing operation it is thus achieved that internal stresses introduced to the material of the airbag by the folding are relieved. Thus a balanced state is brought about which results in the airbag package retaining the desired shape. In particular, the package volume remains substantially unchanged.

In accordance with a further aspect of the method according to the invention, the airbag is heated over a period of time of at least one hour, preferably about two hours.

In accordance with a further aspect of the method according to the invention, compressing is carried out at a pressure of at least 50N/cm$^2$, preferably at a pressure of at least 80N/cm$^2$, further preferred at a pressure of at least 110N/cm$^2$, and especially at a pressure larger than or equal to 130N/cm$^2$.

It is also preferred that after the step of heating a step of rapid cooling of the airbag to an end of process temperature by at least 100° C., preferably by at least 110° C., further preferably by at least 120° C., especially by at least 125° C. is provided.

It is further preferred that the end of process temperature is above room temperature and/or is more than 25° C., preferably more than 30° C., further preferred more than 35° C., especially approx. 40° C.

In accordance with a further preferred configuration of the method according to the invention, it is provided that the step of rapid cooling of the airbag to the end of process temperature takes place in a short period of less than 35 minutes, especially of less than 20 minutes, preferably within 15 minutes.

It is equally preferred that the airbag is compressed during the step of heating and preferably also during the step of rapid cooling of the airbag to the end of process temperature.

Compressing of the airbag can be carried out by a pressing element including an elevation on a contact surface to be placed onto the airbag. The elevation impresses into an outer surface of the airbag package during compression of the airbag so that a recess is formed in the airbag package. This recess can be used, for example, for keeping the space free for an emblem in the cover cap.

BRIEF DESCRIPTION OF THE DRAWINGS

Hereinafter the invention will be illustrated by way of embodiments with reference to the enclosed schematic drawings, in which

FIG. 5 shows a table of compression ratios $V_{real}/V_{Sack}$ with different airbag materials;

DESCRIPTION OF EMBODIMENTS

Figure 1:
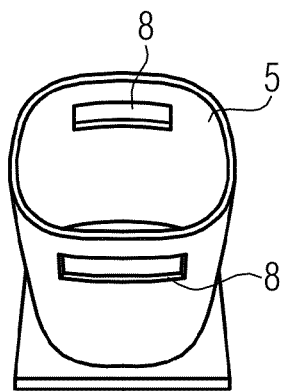
FIG. 1 shows a molding element for manufacturing an airbag package according to the invention in accordance with a preferred embodiment.

FIG. 1 illustrates a container opened to the top which constitutes the molding element 5 for the manufacture of the airbag 2 according to the invention. The molding element 5 has an inner contour or inner geometry, resp., corresponding to the inner contour or inner geometry, resp., of a receiving space in which the airbag package 1 is arranged in the occupant restraint system. The receiving space is usually arranged in a cover cap of an airbag module. Two opposed slit-shaped apertures 8 are clearly visible in the side walls of the molding element 5. They serve for fixing a pressing element 6 which is employed for manufacturing the airbag package 1.

Figure 2:
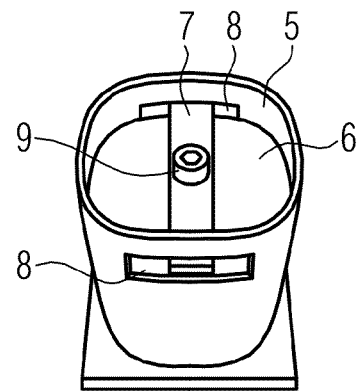
FIG. 2 shows the molding element according to FIG. 1, wherein a pressing element is used for compressing the folded airbag.

Hereinafter the individual steps of the manufacturing method shall be illustrated in detail:

Firstly, the airbag 2 is folded and is transferred into the molding element 5 in the folded state. Then the pressing element 6 preferably exhibiting an outer contour corresponding to the inner contour of the molding element 5 is inserted into the molding element 5 (FIG. 2). The pressing element 6 has a locking beam 7 engaging in the slit-shaped apertures 8 of the molding element 5. The locking beam 7 is fixed to the pressing element 6 by a screw 9. The molding element 5 and the pressing element 6 interact so that a pressing force of approx. 10900 N is applied to the folded airbag 2.

Simultaneously with compressing the airbag 2, heat is applied to the airbag package 1 arranged in the molding element 5. The airbag package 1 is heated to a temperature of more than 130° C., preferably to more than 140° C. It is especially provided that the airbag package is heated to a temperature of 150° C. Compressing and heating of the airbag package 1 takes place over a period of time of about two hours so that the internal stresses in the airbag fabric and in the material of the airbag 2, resp., are relieved. Thus the airbag package 1 retains its shape even when it is removed from the molding element 5.

Figure 3:
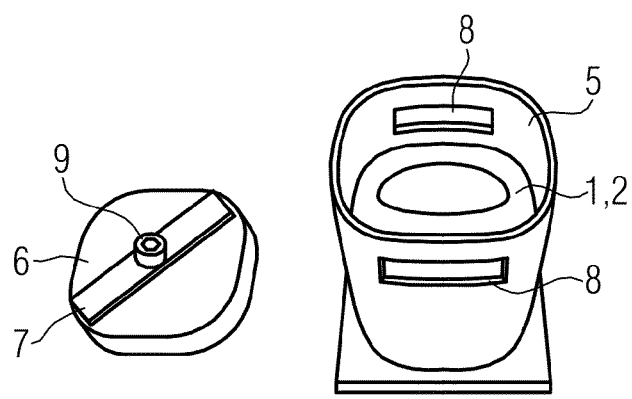
FIG. 3 shows the molding element according to FIG. 1 with the pressing element being removed after compressing the airbag.

FIG. 3 shows the airbag package 1 arranged in the molding element 5 after the compressing and heating operation.

This is followed by a step of rapid cooling the airbag package by at least 80° C., preferably at least 90° C., further preferred at least 100° C., especially at least 110° C., wherein also cooling by at least 120° C. or at least 125° C. is possible in accordance with a special embodiment.

In accordance with a particularly preferred configuration, cooling is performed from a holding temperature of 150° C. to an end of process temperature of 40° C.

The compressed airbag package is cooled from the heating temperature to the end of process temperature, according to the invention, within a short period of less than 25 minutes, especially less than 20 minutes, preferably within 15 minutes.

Figure 4:
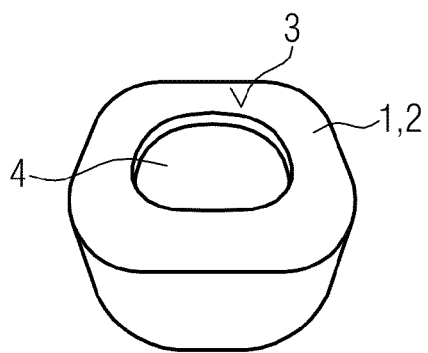
FIG. 4 shows an airbag package according to the invention after compression in accordance with the steps illustrated in FIGS. 1-3 in the dimensionally stable state.

The compressed and cooled airbag package 1 can now be removed from the molding element 5 and has a continuously stable shape (FIG. 4).

In the embodiment shown here it is further provided that the pressing element 6 includes an elevation which upon compression of the airbag package 1 leaves a recess 4 on an outer surface 3 of the airbag package. The recess 4 serves, for example, for keeping free an emblem space of a vehicle emblem in a cover cap.

The peculiarity of the airbag package manufactured in this way is shown in the compression factor which is definitely lower than in known airbag packages. The compression factor corresponds to the ratio between the package volume $V_{real}$ and the airbag volume $V_{Sack}$ according to the quotient $V_{real}/V_{Sack}$. The table in FIG. 5 shows a survey of the achievable compression factors $V_{compression}$ in the case of different airbag materials.

The compression factor $V_{compression}$ is calculated as follows:

The package volume $V_{real}$ of the airbag package is composed, on the one hand, of the volume of the airbag material (airbag volume $V_{Sack}$) and, on the other hand, of the air volume enclosed between the folds and in between the fabric of the airbag material. The air volume is referred to as free space volume $V_{frei}$.

The airbag volume $V_{Sack}$ can be easily calculated from the known density and the known weight per unit area of the airbag materials used. The airbag volume $V_{Sack}$ thus substantially corresponds to a theoretical fabric volume which the airbag package 1 would have, if it were completely free from air inclusions. The airbag volume is referred to as "calculated theoretical fabric volume" in the table according to FIG. 5.

Usually the real package volume $V_{real}$ is definitely above the value for the theoretically calculated airbag volume $V_{Sack}$. The package volume $V_{real}$ is referred to as "package volume" in the table according to FIG. 5.

For judging the packing density the ratio between the package volume $V_{real}$ and the airbag volume $V_{Sack}$ is relevant. This ratio (the compression factor) substantially indicates how many air inclusions are still remaining in the airbag package 1. An as small value as possible is strived for so as to adapt the airbag package 1 to as small mounting spaces as possible.

By the method according to the invention relatively large compression factors can be realized, as is illustrated by the table in FIG. 5. Concretely speaking, real package volumes $V_{real}$ which are larger by maximally 1.8 times than a theoretical airbag volume $V_{Sack}$ that is calculated from the density of the airbag fabric or airbag material used can be obtained by the method according to the invention. It is assumed that the airbag material used is not provided as a fabric having air inclusions and clearances, resp., but as a compact material block made of the fabric material of the airbag 2. The material block thus is free from air inclusions.

Apart from that, the invention also enables the airbag package to be independently continuously dimensionally stable. This is achieved as follows: By mechanically forced conditions internal stresses occur in the fabric. On a microscopic level, these stresses are primarily due to the rigidity of the "tie molecules" in the amorphous range. This rigidity is due to energy differences in the different cis-trans-gauche conformation of the chains and the secondary valences among the chains, i.e. by both intra-molecular and inter-molecular interactions.

The method according to the invention now supplies in a first step sufficient energy to the folded airbag so that the "tie molecules" being tensioned "are moving more freely" in the amorphous range and the internal stresses are thus relieved. In a second step again energy is withdrawn from the system so that the chains are "freezing" in the new conformation. The entire airbag package thus remains independently in the predefined shape even after removing the outer forced condition.

Figure 7D:
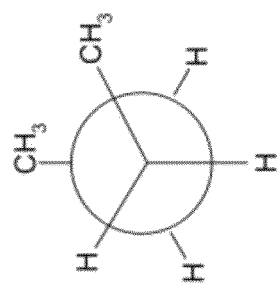
FIGS. 7a-d show the four phases of the fabric molecules of an airbag package to which a continuously stable shape has been imparted in accordance with the method according to the invention.
Figure 7D:
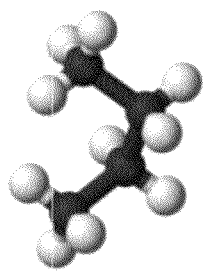
Figure 7C:
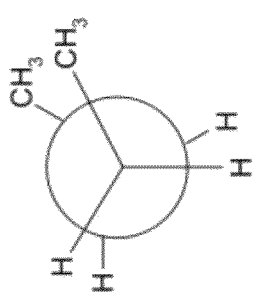
Figure 7C:
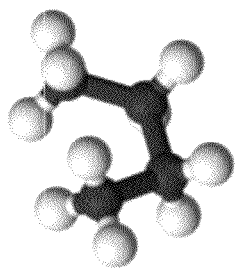
Figure 7B:
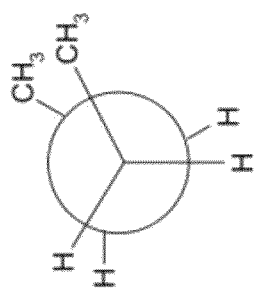
Figure 7B:
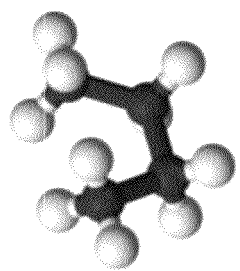
Figure 7A:
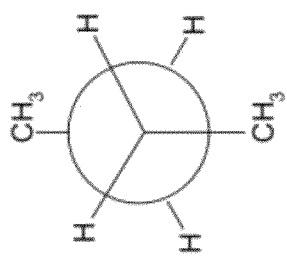
Figure 7A:
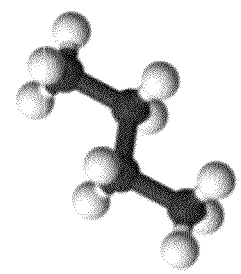

FIGS. 7a to 7d show the four phases of the fabric molecules of an airbag package brought in continuously stable shape in accordance with the method according to the invention, wherein FIG. 7a shows the fabric prior to finishing, FIG. 7b shows the fabric in folded and molded shape, FIG. 7c shows the fabric after being heated to T=150° C. and FIG. 7d represents the fabric two hours later after being cooled to T=40° C.

As illustrated in FIG. 7a, the fabric is provided in its original state in its arrangement most favorable in terms of energy as forced conditions are missing; the C—C bond angle is a tetrahedral angle.

As is illustrated in FIG. 7b, folding and, resp., molding of the fabric causes bending of the molecules and thus a deviation from the tetrahedral angle; internal stresses are occurring in the molecule so that the fabric would rebound without the outer force of the molding press (rebound effect).

As illustrated in FIG. 7c, the molecules are rotated by 120° C. and −120° C., resp., about the longitudinal axis due to the thermal activation. Hence over time the internal stresses are relieved with the further consequence that the bonding angles adapt to tetrahedral angles again.

As finally illustrated in FIG. 7d, the new conformation is most favorable in terms of energy with a predefined forced condition (airbag package folded in the container). The rapid cooling deactivates the continued rotation of the molecules so that the airbag package is thermally fixed and continuously does no longer unfold even after the forced condition has been removed.

Figure 6:
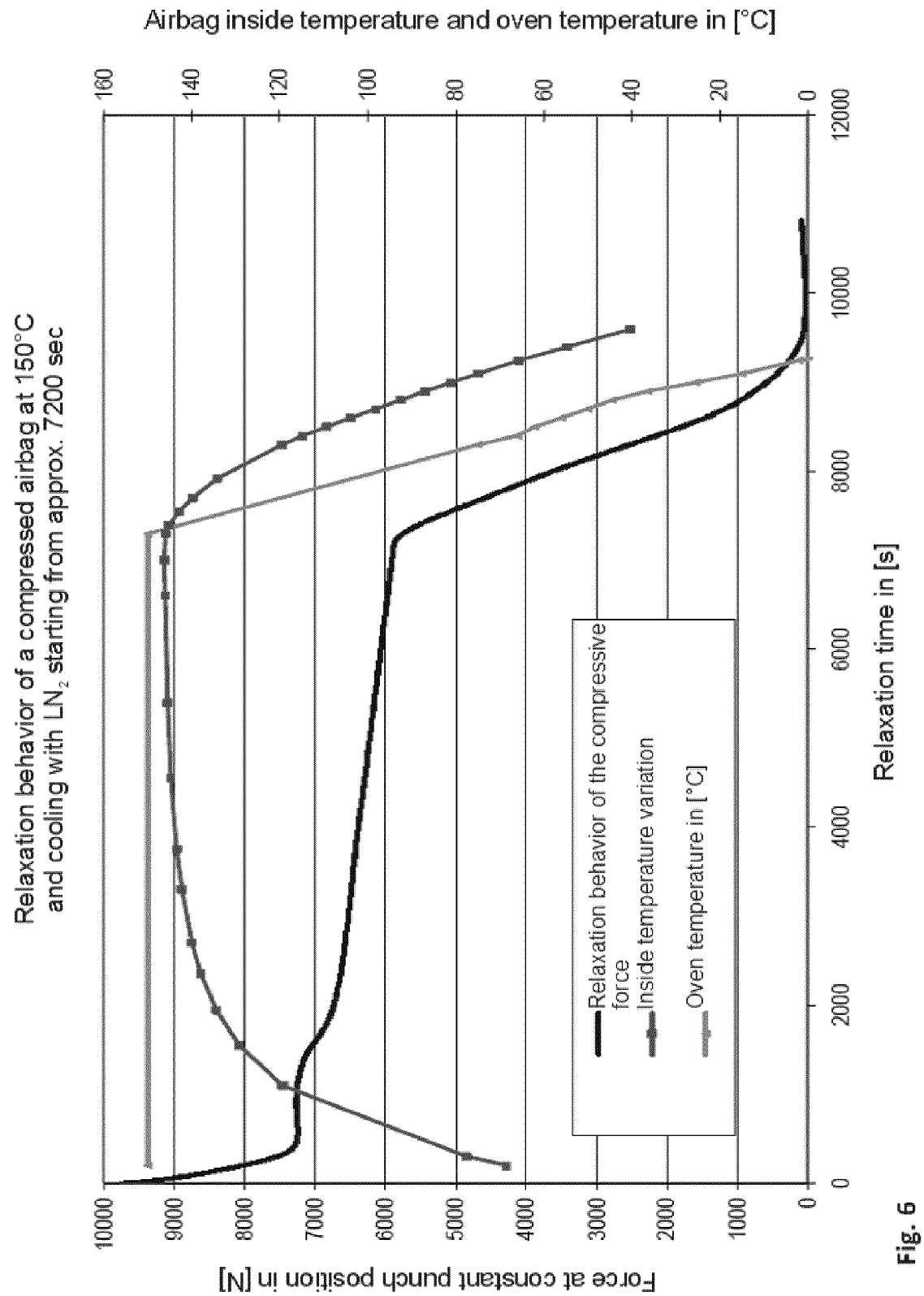
FIG. 6 shows a diagram representing the relaxation behavior of an airbag module in accordance with the method according to the invention over pressure and time.

For this purpose, tests were carried out which confirm the fact that according to the invention it is possible to produce the airbag package independently in a continuously dimensionally stable manner: An airbag package brought into shape was introduced in the cold state into an oven heated to 150° C. The pressing punch used for shaping was loaded with 10000N within approx. 60 s-90 s. The punch position reached in this way was then kept constant over the entire test. In this state the force acting on the punch was recorded for 2 h=7200 s. For better manageability of the temperature variation the temperature was measured inside the airbag by a thermocouple. Following the 2 h at 150° C. the oven or the apparatus including the airbag was cooled by means of liquid nitrogen (ln$_2$). The results are listed in FIG. 6 illustrating the course of the pressure force and the temperature during the test.

It turns out that during the first minutes the greatest force reduction takes place. Upon reaching the glass transition temperature(s) quick relaxation of the pressure force up to the filling of present "cavities" is given. The pressure force acting is reduced by cooling. Upon reaching the inside temperature of approx. 50° C. to 60° C. the pressure force is less than 100N.

Cooling of the compressed airbag package from the heating temperature to the end of process temperature takes place, according to the invention, within a short period of time of less than 40 minutes, especially of less than 35 minutes, especially of less than 20 minutes, especially of less than 15 minutes, preferably within 10 minutes.

It is provided that the end of process temperature, viz. the temperature at the end of the directed rapid cooling is above the room temperature and/or amounts to more than 25° C., preferably more than 30° C., further preferred more than 35° C., especially approx. 40° C. Subsequent further cooling is imaginable, but does not influence the method according to the invention and the continuous dimensional stability of the airbag package.

LIST OF REFERENCE NUMERALS

1 Airbag package
2 airbag
3 external surface
4 recess
5 molding element
6 pressing element
7 locking beam
8 aperture
9 screw

The invention claimed is:

1. An airbag package (1) for an occupant restraint system of a vehicle comprising
a folded airbag (2) and
clearances formed between the material of the airbag, wherein the airbag package (1) exhibits a real package volume $V_{real}$, composed of the airbag volume $V_{Sack}$ of the airbag (2) and the clearance volume $V_{frei}$ of the clearances, wherein the ratio $V_{real}/V_{Sack}$ between the package volume $V_{real}$ and the airbag volume $V_{Sack}$ is at most 3.2.

2. The airbag package (1) according to claim 1, wherein the ratio $V_{real}/V_{Sack}$ between the package volume $V_{real}$ and the airbag volume $V_{Sack}$ is at most 1.8.

3. The airbag package (1) according to claim 1, wherein the airbag package (1) is independently continuously dimensionally stable.

4. The airbag package (1) according to claim 1, wherein the airbag (2) includes at least one outer surface (3) having a recess (4).

5. An occupant restraint system of a vehicle comprising an airbag package (1) according to claim 1.

6. A method of manufacturing an airbag package for an occupant restraint system comprising:
folding an airbag;
inserting the folded airbag into a molding element;
using a press to compress the folded airbag by moving a press element to a press position at which a compression force of at least about 50-130 N/cm² is applied to the folded airbag;
heating the compressed and folded airbag to about 125° C. to 150° C. for at least 1-2 hours while maintaining the press element at the press position; and thereafter
cooling the heated and compressed airbag in the molding element by at least about 100° C. to 125° C. within a period of less than 35 minutes.

7. The method according to claim 6, wherein cooling the heated and compressed airbag comprises cooling the heated and compressed airbag to an end of process temperature of 25° C. to 40° C.

8. The method according to claim 6, wherein using a press to compress the folded airbag comprises applying the compression force within 60-90 seconds.

9. The method according to claim 6, wherein cooling the heated and compressed airbag is performed within a period of less than 20 minutes.

10. The method according to claim 6, wherein cooling the heated and compressed airbag is performed within a period of less than 15 minutes.

11. The method according to claim 6, wherein using a press to compress the folded airbag comprises moving the press element to a press position at which the compression force applied to the folded airbag is at least 80 N/cm².

12. The method according to claim 6, wherein using a press to compress the folded airbag comprises moving the press element to a press position at which the compression force applied to the folded airbag is at least 110 N/cm².

13. The method according to claim 6, wherein using a press to compress the folded airbag comprises moving the press element to a press position at which the compression force applied to the folded airbag is greater than or equal to 130 N/cm².

14. The method according to claim 6, wherein heating the compressed and folded airbag comprises heating the compressed and folded airbag to approximately 150° C.

15. The method according to claim 6, wherein heating the compressed and folded airbag comprises heating the compressed and folded airbag for approximately 2 hours.

16. The method according to claim 6, wherein compressing the airbag comprises creating a recess on an outer surface of the airbag package by including an elevation on an airbag contact surface of a pressing element used to compress the airbag.

17. An airbag package manufactured according to the method of claim 16.

18. The airbag package of claim 17, comprising clearances formed between the material of the airbag, wherein the airbag package exhibits a real package volume $V_{real}$ composed of the airbag volume $V_{Sack}$ of the airbag and the clearance volume $V_{frei}$ of the clearances, wherein the ratio $V_{real}/V_{Sack}$ between the package volume $V_{real}$ and the airbag volume $V_{Sack}$ is at most 3.2.

19. The airbag package according to claim 18, wherein the ratio $V_{real}/V_{Sack}$ between the package volume $V_{real}$ and the airbag volume $V_{Sack}$ is at most 1.8.

20. The airbag package according to claim 18, wherein the airbag package is independently continuously dimensionally stable.

21. The airbag package according to claim 17, comprising a recess on an outer surface of the airbag.

22. An occupant restraint system of a vehicle comprising the airbag package according to claim 17.

* * * * *